US011726275B2

(12) United States Patent
Izawa et al.

(10) Patent No.: US 11,726,275 B2
(45) Date of Patent: Aug. 15, 2023

(54) OPTICAL RECEPTACLE AND OPTICAL MODULE (71) Applicant: Enplas Corporation, Kawaguchi (JP)

(72) Inventors: Takahiro Izawa, Saitama (JP); Akinobu Seki, Saitama (JP)

(73) Assignee: Enplas Corporation, Kawaguchi (JP)

(*) Notice: Subject to any disclaimer, the term of this patent is extended or adjusted under 35 U.S.C. 154(b) by 114 days.

(21) Appl. No.: 17/211,897

(22) Filed: Mar. 25, 2021

(65) Prior Publication Data

US 2021/0302673 A1 Sep. 30, 2021

(30) Foreign Application Priority Data

Mar. 27, 2020 (JP) .................................. 2020-058536

(51) Int. Cl.
*G02B 6/42* (2006.01)
(52) U.S. Cl.
CPC ......... *G02B 6/4215* (2013.01); *G02B 6/4214* (2013.01)
(58) Field of Classification Search
CPC ....................................................... G02B 6/42
USPC .......................................................... 385/37
See application file for complete search history.

(56) References Cited

U.S. PATENT DOCUMENTS

| 4,126,832 A * | 11/1978 | Schlossberg | H01S 3/08009 372/4 |
| 6,829,286 B1 * | 12/2004 | Guilfoyle | G02B 6/4214 372/96 |
| 7,535,944 B1 * | 5/2009 | Guilfoyle | H01S 5/423 372/108 |
| 7,627,018 B1 * | 12/2009 | Guilfoyle | G02B 6/4214 372/102 |
| 10,591,672 B2 * | 3/2020 | Van Thourhout | G02B 6/12004 |
| 2003/0012496 A1 * | 1/2003 | Yamagata | G02B 6/4244 385/33 |
| 2003/0174344 A1 * | 9/2003 | Jones | G01D 5/38 356/616 |
| 2008/0181264 A1 * | 7/2008 | Mizuyama | H01S 5/141 372/20 |
| 2012/0147471 A1 * | 6/2012 | Liu | G02B 27/14 359/629 |

(Continued)

FOREIGN PATENT DOCUMENTS

WO 00/17691 3/2000

*Primary Examiner* — Kaveh C Kianni
(74) *Attorney, Agent, or Firm* — Amin, Turocy & Watson, LLP (57) ABSTRACT An optical receptacle optically couples a light emitting element and an optical transmission member when disposed between the light emitting element and the optical transmission member, and includes a first optical surface that allows incidence of light emitted from the light emitting element; a second optical surface that emits, toward the optical transmission member, light emitted from the light emitting element and advanced inside the optical receptacle; and a diffraction grating disposed on the first optical surface, on the second optical surface, or on a light path between the first and second optical surfaces. The diffraction grating is configured such that zero-order diffraction light of the light emitted from the light emitting element reaches an end portion of the optical transmission member, and that primary diffraction light of the light emitted from the light emitting element does not reach the end portion of the optical transmission member.

6 Claims, 9 Drawing Sheets (56) References Cited

U.S. PATENT DOCUMENTS

2014/0010251 A1\* 1/2014 Zayer .................... H01S 3/1001
359/333
2019/0212699 A1\* 7/2019 Waldern ................... G03H 1/20

\* cited by examiner

OPTICAL RECEPTACLE AND OPTICAL MODULE

CROSS REFERENCE TO RELATED APPLICATIONS

This application is entitled to and claims the benefit of Japanese Patent Application No. 2020-058536, filed on Mar. 27, 2020, the disclosure of which including the specification, drawings and abstract is incorporated herein by reference in its entirety.

TECHNICAL FIELD

The present invention relates to an optical receptacle and an optical module.

BACKGROUND ART

In the related art, an optical module including a light emitting element such as a surface emitting laser (e.g., vertical cavity surface emitting laser (VCSEL)) is used for optical communications using an optical transmission member such as an optical fiber and an optical waveguide. The optical module includes one or more photoelectric conversion elements (light emitting elements or light reception elements), and an optical receptacle (coupling lens) configured for transmission, reception, or transmission and reception.

In addition, for safety purposes, an optical module configured for light speed communication may attenuate the quantity of light emitted from a transmitting optical receptacle (see, for example, PTL 1). In addition, as a method for attenuating light emitted from a transmitting optical receptacle, an attenuation coating may be provided on the optical surface.

PTL 1 discloses a coupling lens for optically coupling a light source and an optical fiber. The coupling lens disclosed in PTL 1 includes an incidence surface on the light source side, and an emission surface on the optical fiber side. The emission surface is a so-called diffraction lens, and includes a ring-band that is concentric about the optical axis of the emission surface.

The coupling lens disclosed in PTL 1 adjusts the refraction efficiency of the diffraction lens such that zero-order diffraction light and primary diffraction light transmitted through the diffraction lens are utilized without utilizing secondary and subsequent diffraction light.

CITATION LIST

Patent Literature

PTL 1
WO00/17691

SUMMARY OF INVENTION

Technical Problem

With the coupling lens disclosed in PTL 1 using zero-order diffraction light and primary diffraction light, it is necessary to accurately form the diffraction grating, and it is difficult to adjust the quantity of light in some cases. In addition, in the optical surface provided with the attenuation coating, the attenuation coating may be cracked, and attenuation of the light quantity of light may not be achieved.

In view of this, an object of the present invention is to provide an optical receptacle that can accurately attenuate light emitted from a light emitting element without using other members such as an optical filter and an attenuation coating. In addition, another object of the present invention is to provide such an optical module including the optical receptacle.

Solution to Problem

To achieve the above-mentioned object, an optical receptacle of an embodiment of the present invention is configured to be disposed between a light emitting element and an optical transmission member and configured to optically couple the light emitting element and the optical transmission member, the optical receptacle including: a first optical surface configured to allow incidence of light emitted from the light emitting element; a second optical surface configured to emit, toward the optical transmission member, light emitted from the light emitting element and advanced inside the optical receptacle; a diffraction grating disposed on the first optical surface, on the second optical surface, or on a light path between the first optical surface and the second optical surface. The diffraction grating is configured such that zero-order diffraction light of the light emitted from the light emitting element reaches an end portion of the optical transmission member, and that primary diffraction light of the light emitted from the light emitting element does not reach the end portion of the optical transmission member.

To achieve the above-mentioned object, an optical module of an embodiment of the present invention includes: a photoelectric conversion device including a light emitting element; and an optical receptacle configured to optically couple, to an optical transmission member, light emitted from the light emitting element. The optical receptacle is the above-mentioned optical receptacle.

Advantageous Effects of Invention

The optical receptacle of the present invention can accurately attenuate light emitted from a light emitting element.

DESCRIPTION OF EMBODIMENTS

Embodiment 1

Configuration of Optical Module

Figure 1:
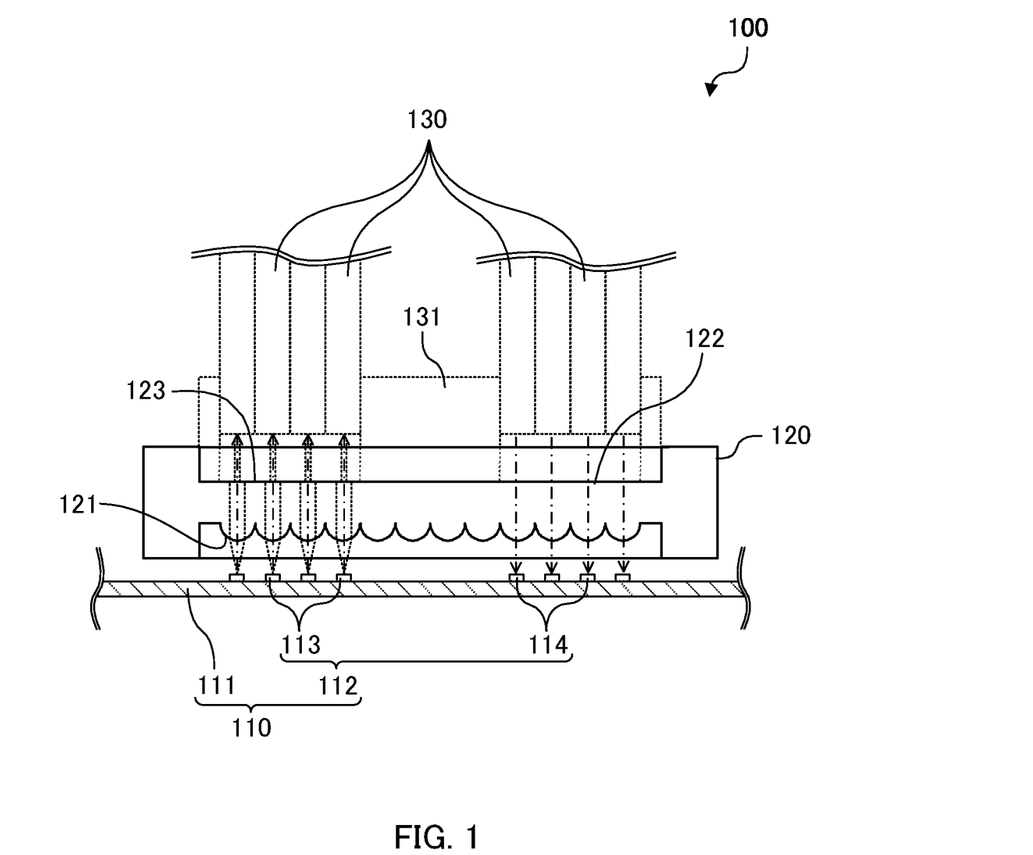
FIG. 1 is a sectional view of an optical module according to Embodiment 1.

FIG. 1 is a sectional view of optical module 100 according to Embodiment 1 of the present invention. Note that in FIG. 1, the hatching of optical receptacle 120 is omitted for illustration of light paths. In FIG. 1, the center of the light flux is illustrated with a dashed line, and the outline of the light flux is illustrated with a dotted line.

As illustrated in FIG. 1, optical module 100 includes photoelectric conversion device 110 including one or more photoelectric conversion elements 112, and optical receptacle 120. Optical module 100 is used in the state where optical transmission member 130 is connected to optical receptacle 120.

Photoelectric conversion device 110 includes substrate 111 and photoelectric conversion element 112.

On substrate 111, one or more photoelectric conversion elements 112 and optical receptacle 120 are disposed. On substrate 111, a protrusion (omitted in the drawing) for setting the position of optical receptacle 120 may be formed. By fitting a recess (omitted in the drawing) of optical receptacle 120 to the protrusion, optical receptacle 120 can be positioned at a predetermined position with respect to photoelectric conversion element 112 disposed on substrate 111. The material of substrate 111 is not limited. Substrate 111 is a glass composite substrate, a glass epoxy substrate, or the like, for example.

Photoelectric conversion element 112 emits light of a predetermined wavelength, or receives light of a predetermined wavelength. Photoelectric conversion element 112 is light emitting element 113 or light reception element 114, and is disposed on substrate 111. In transmitting optical module 100, light emitting element 113 is used as photoelectric conversion element 112. In receiving optical module 100, light reception element 114 is used as photoelectric conversion element 112. Light emitting element 113 is a vertical cavity surface emitting laser (VCSEL), for example. Light reception element 114 is a photodetector, for example. In the present embodiment, optical module 100 is transmitting and receiving optical module 100, and therefore photoelectric conversion element 112 includes four light emitting elements 113 and four light reception elements 114.

On substrate 111, optical receptacle 120 is disposed opposite to photoelectric conversion element 112. Optical receptacle 120 optically couples photoelectric conversion element 112 and the end surface of optical transmission member 130 in the state where optical receptacle 120 is disposed between photoelectric conversion element 112 and optical transmission member 130. In the present embodiment, optical receptacle 120 emits, toward the end surface of optical transmission member 130, light emitted from photoelectric conversion element 112 (light emitting element 113), and emits, toward photoelectric conversion element 112 (light reception element 114), light emitted from the end surface of optical transmission member 130. The configuration of optical receptacle 120 will be elaborated later.

The type of optical transmission member 130 is not limited. Examples of the type of optical transmission member 130 include an optical fiber and an optical waveguide. Optical transmission member 130 is connected to optical receptacle 120 through ferrule 131. In the present embodiment, optical transmission member 130 is an optical fiber. In addition, the optical fiber may be of a single mode type, or a multiple mode type. In the case where optical transmission member 130 is an optical fiber, optical transmission member 130 includes a core and a cladding.

Configuration of Optical Receptacle

Figure 2A:
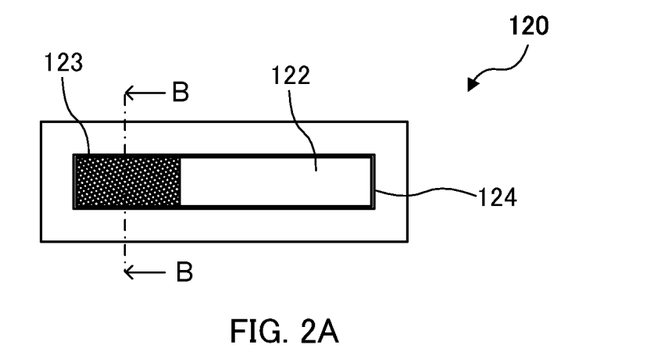
FIGS. 2A to 2D illustrate a configuration of an optical receptacle according to Embodiment 1.
Figure 2B:
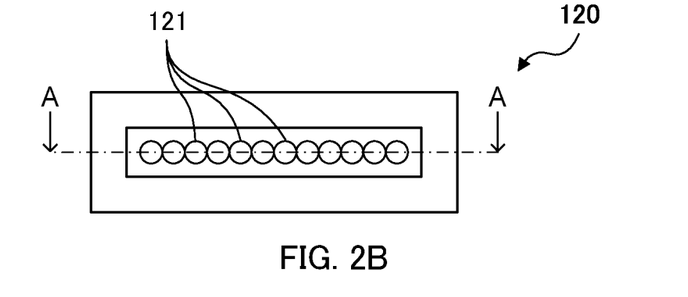
Figure 2C:
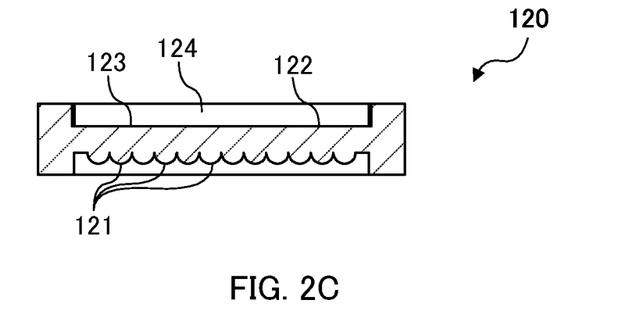
Figure 2D:
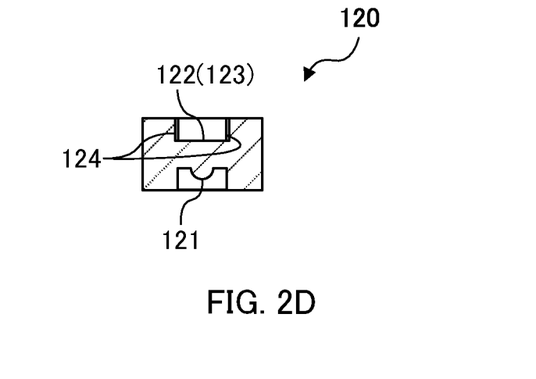

FIGS. 2A to 2D illustrate a configuration of optical receptacle 120 according to Embodiment 1. FIG. 2A is a plan view of optical receptacle 120 according to the present embodiment, FIG. 2B is a bottom view, FIG. 2C is a sectional view taken along line A-A of FIG. 2B, and FIG. 2D is a sectional view taken along line B-B of FIG. 2A.

As illustrated in FIGS. 2A to 2D, optical receptacle 120 is a member having a substantially cuboid shape. Optical receptacle 120 includes first optical surface 121, second optical surface 122, diffraction grating 123, and light blocking part 124. Optical receptacle 120 according to the present embodiment is a transmitting and receiving optical receptacle, and therefore includes a region (transmission region) that serves a function of transmitting, to optical transmission member 130, light emitted from light emitting element 113, and a region (light reception region) that serves a function of receiving, at light reception element 114, light emitted from optical transmission member 130. In the example illustrated in FIGS. 2A to 2D, the left side in the drawings is the transmission region and the right side in the drawings is the reception region.

Optical receptacle 120 is formed of a material that is optically transparent to light of a wavelength used for optical communications. Examples of the material of optical receptacle 120 include polyetherimide (PEI) such as ULTEM (registered trademark) and a transparent resin such as cyclic olefin resin. Optical receptacle 120 may be produced by injection molding, for example. Optical receptacle 120 is integrally molded with diffraction grating 123 included therein.

First optical surface 121 is an optical surface that allows light emitted from photoelectric conversion element 112 (light emitting element 113) to enter optical receptacle 120, or is an optical surface that emits, toward photoelectric conversion element 112 (light reception element 114), light entered from second optical surface 122. In the present embodiment, first optical surfaces 121 are disposed opposite to photoelectric conversion element 112 in a line along the longitudinal direction. In the present embodiment, twelve first optical surfaces 121 are disposed in a line. In the example illustrated in FIG. 2B, four first optical surfaces 121 on the left side in the drawing function as incidence surfaces, four first optical surfaces 121 on the right side in the drawing function as emission surfaces, and four first optical surfaces 121 at the center are not used.

The shape of first optical surface 121 is not limited. The shape of first optical surface 121 may be a flat surface, a convex lens surface protruding toward photoelectric conversion element 112, or a concave lens surface recessed toward photoelectric conversion element 112. In the present embodiment, the shape of first optical surface 121 is a convex lens surface protruding toward photoelectric conversion element 112. In addition, first optical surface 121 has a circular shape in plan view. Preferably, the central axis of first optical surface 121 is perpendicular to the light-emitting surface or the light-receiving surface of photoelectric conversion element 112 (and the front surface of substrate 111). In addition, preferably, the central axis of first optical surface 121 coincides with the optical axis of light emitted from photoelectric conversion element 112 (light emitting element 113), or light incident on photoelectric conversion element 112 (light reception element 114).

Second optical surface 122 is an optical surface that emits, toward the end surface of optical transmission member 130, light entered from first optical surface 121, or is an optical surface that allows, to enter optical receptacle 120, light emitted from the end surface of optical transmission member 130. In the present embodiment, diffraction grating 123 is formed in a part of second optical surface 122. The shape of second optical surface 122 is not limited. The shape of second optical surface 122 may be a flat surface, a convex lens surface protruding toward the end surface of optical transmission member 130, or a concave lens surface recessed toward photoelectric conversion element 112. In the present embodiment, the shape of second optical surface 122 is a flat surface. In the example illustrated in FIG. 2A, the region on the left side in the drawing functions as the emission surface, the region on the right side in the drawing functions as the incidence surface, and the region at the center is not used.

Diffraction grating 123 is configured such that predetermined diffraction light reaches the end portion of optical transmission member 130. In the present embodiment, preferably, diffraction grating 123 is configured such that the zero-order diffraction light reaches the end portion of optical transmission member 130 whereas the primary diffraction light does not reach the end portion of optical transmission member 130 so that only the zero-order diffraction light reaches the end portion of optical transmission member 130.

Diffraction grating (blazed diffraction grating) 123 includes a plurality of blaze shapes (saw-tooth shapes). The number of the blaze shapes is appropriately set in accordance with the ratio of the light to be attenuated. For example, in the case where light is attenuated such that the quantity of the light that reaches the end portion of optical transmission member 130 is 40% with respect to the light emitted from light emitting element 113, the number of the blaze shapes in a region of a square with each side of 0.3 mm is approximately 4 to 16. Note that the sizes of the blaze shapes may be identical to each other or different from each other. The height of the blaze shape is appropriately set in accordance with the desired order of the diffraction light. In the present embodiment, the zero-order diffraction light is mainly generated, and therefore the height of the blaze shape is preferably 350 to 450 nm. With the blaze shape having the height that falls within the above-mentioned range, diffraction light of the orders other than the zero-order is less generated. The blazing angle is appropriately set in accordance with the position to which the generated diffraction light is delivered. In the present embodiment, diffraction grating 123 is configured such that diffraction light of the orders other than the zero-order does not reach the end surface of optical transmission member 130 by adjusting the height of the blaze shape. That is, by only changing the height of the blaze shape, only the zero-order diffraction light can be delivered to the end surface of optical transmission member 130. The shape of the surface (in the present embodiment, the second optical surface) where the blazed shape is formed is not limited. The shape of the surface where the blaze shape is formed may be a flat surface, a curved surface, or a surface with a sin-curve shape in cross-section. That is, in diffraction grating (transmission (type) diffraction grating) 123 of the present embodiment, the number of the blaze shapes, the blazing angle and the shape of the installation surface are appropriately set in accordance with the attenuation rate and the position for focusing the diffraction light.

Light blocking part 124 blocks the light other than the zero-order diffraction light transmitted through diffraction grating 123. The position of light blocking part 124 is not limited as long as the above-mentioned function can be ensured. Light blocking part 124 may be formed in the inner surface of the recess where second optical surface 122 is formed, or in the outer surface of optical receptacle 120. In the present embodiment, light blocking part 124 is formed in the inner surface of the recess. In this case, the positions of light blocking part 124 and diffraction grating 123 are close to each other, and thus the light other than the zero-order diffraction light can be efficiently blocked. The configuration of light blocking part 124 is not limited. As light blocking part 124, crinkled finish or a black light shielding layer may be provided, for example.

Next, light paths in optical module 100 according to the present embodiment are described. Light emitted from photoelectric conversion element 112 (light emitting element 113) enters optical receptacle 120 from first optical surface 121. At this time, light entered into optical receptacle 120 is converted to collimated light by first optical surface 121, and the light advances inside optical receptacle 120. Next, the light entered into optical receptacle 120 is emitted at second optical surface 122 toward the end portion of optical transmission member 130. Here, diffraction grating 123 is disposed in second optical surface 122, and therefore, of the diffraction light generated from the light having traveled inside optical receptacle 120, only the zero-order diffraction light reaches the end portion of optical transmission member 130 (see FIG. 1). Note that it is preferable that the zero-order diffraction light reach the core part of optical transmission member (optical fiber) 130, not the cladding part. With such a configuration, the quantity of the light emitted from light emitting element 113 can be correctly adjusted. Note that in the present embodiment, diffraction light other than the zero-order diffraction light is also generated, but such light is controlled to reach the part other than the core part of optical transmission member 130.

On the other hand, light emitted from the end surface of optical transmission member 130 enters optical receptacle 120 from second optical surface 122 where diffraction grating 123 is not formed in the reception region. Next, the light entered into optical receptacle 120 is emitted, at first optical surface 121, to the outside of optical receptacle 120 toward photoelectric conversion element 112 (light reception element 114). The light emitted to the outside of optical receptacle 120 at first optical surface 121 reaches photoelectric conversion element 112 (light reception element) while being converged (see FIG. 1).

Effect

In optical receptacle 120 according to the present embodiment, the generation of diffraction light other than the zero-order diffraction light is prevented by adjusting the height of the blaze shape, and the travelling direction of the diffraction light is controlled by adjusting the angle of the blaze shape, such that the quantity of the light that enters optical transmission member 130 after being emitted from light emitting element 113 is attenuated. In this manner, the quantity of the light emitted from light emitting element 113 can be accurately attenuated without using other members.

In addition, in the case where optical receptacle 120 is manufactured by injection molding, it can be readily manufactured by only changing the portion of the metal mold corresponding to diffraction grating 123.

Modification 1

Next, an optical module according to Modification 1 of the present embodiment is described. The optical module according to the present modification differs from optical module 100 according to Embodiment 1 only in the configuration of optical receptacle 220. In view of this, the components similar to those of optical module 100 according to Embodiment 1 are denoted with the same reference numerals and the description thereof is omitted.

Figure 3A:
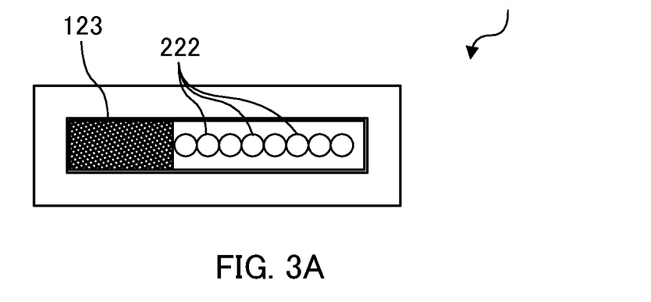
FIGS. 3A to 3D illustrate a configuration of an optical receptacle according to Modification 1 of Embodiment 1.
Figure 3B:
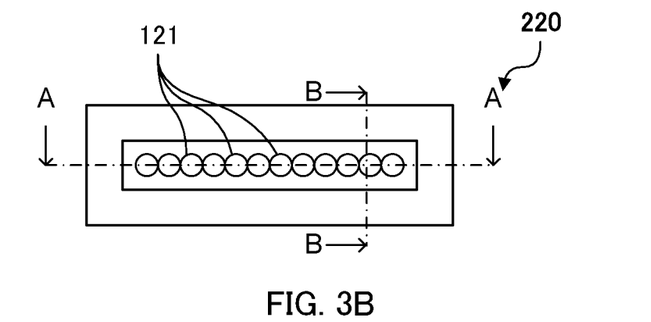
Figure 3C:
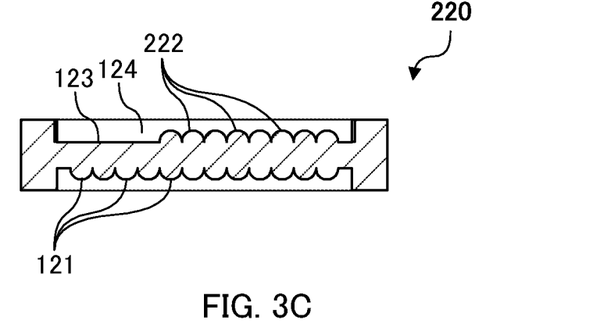
Figure 3D:
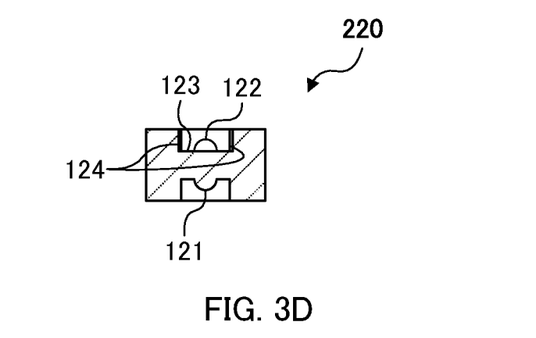

FIGS. 3A to 3D illustrate a configuration of optical receptacle 220 according to Modification 1 of Embodiment 1. FIG. 3A is a plan view of optical receptacle 220 according to Modification 1 of the present embodiment, FIG. 3B is a bottom view, FIG. 3C is a sectional view taken along line A-A of FIG. 3B, and FIG. 3D is a sectional view taken along line B-B of FIG. 3B.

Configuration of Optical Receptacle

As illustrated in FIGS. 3A to 3D, optical receptacle 220 includes first optical surface 121, second optical surface 222, diffraction grating 123, and light blocking part 124. In the present embodiment, in the reception region, second optical surface 222 is a convex lens surface protruding toward optical transmission member 130. In the reception region, second optical surfaces 222 are disposed opposite to the end surface of optical transmission member 130 in a line along the longitudinal direction. Preferably, the central axis of second optical surface 222 coincides with the central axis of the end surface of optical transmission member 130.

Also in the optical module according to Modification 1 of the present embodiment, preferably, diffraction grating 123 is configured such that the zero-order diffraction light reaches the end portion of optical transmission member 130 whereas the primary diffraction light does not reach the end portion of optical transmission member 130 so that only the zero-order diffraction light reaches the end portion of optical transmission member 130.

Effect

The optical module according to the present embodiment can achieve an increased coupling efficiency on the reception side while achieving the same effect as that of optical module 100 according to Embodiment 1.

Modification 2

Next, an optical module according to Modification 2 of the present embodiment is described. The optical module according to the present modification differs from optical module 100 according to Embodiment 1 only in the configuration of optical receptacle 320. In view of this, the components similar to those of optical module 100 according to Embodiment 1 are denoted with the same reference numerals and the description thereof is omitted.

Figure 4A:
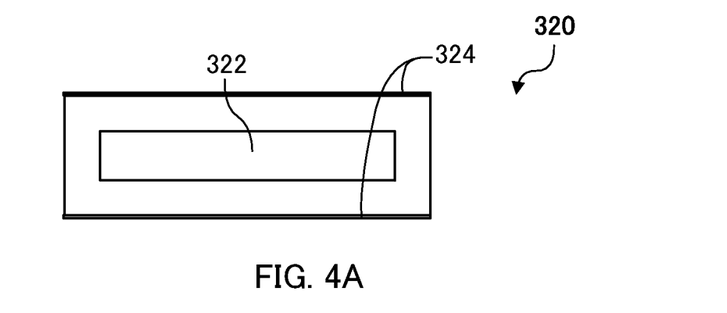
FIGS. 4A to 4D illustrate a configuration of an optical receptacle according to Modification 2 of Embodiment 1.
Figure 4B:
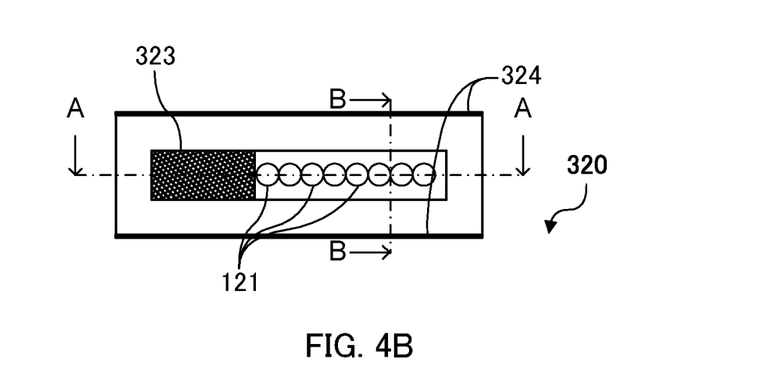
Figure 4C:
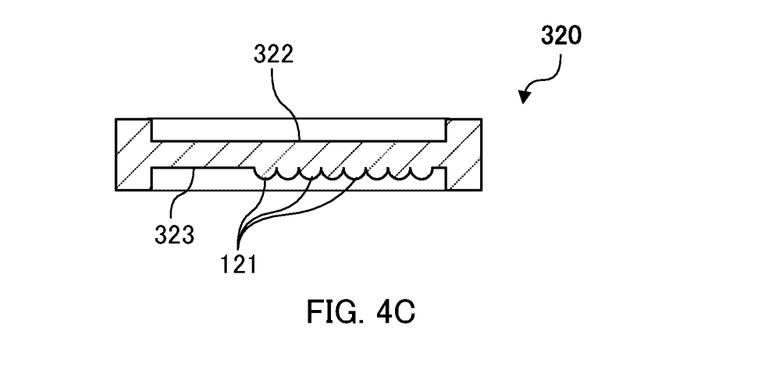
Figure 4D:
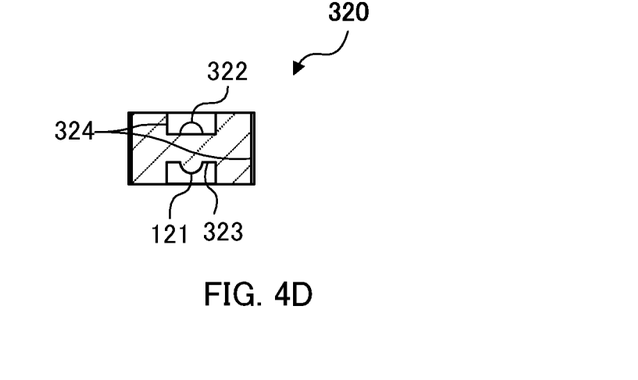

FIGS. 4A to 4D illustrate a configuration of optical receptacle 320 according to Modification 2 of Embodiment 1. FIG. 4A is a plan view of optical receptacle 320 according to Modification 2 of the present embodiment, FIG. 4B is a bottom view, FIG. 4C is a sectional view taken along line A-A of FIG. 4B, and FIG. 4D is a sectional view taken along line B-B of FIG. 4B.

Configuration of Optical Receptacle

As illustrated in FIGS. 4A to 4D, optical receptacle 320 includes first optical surface 121, second optical surface 322, diffraction grating 323, and light blocking part 324. In the present embodiment, in the transmission region, first optical surface 121 is a flat surface disposed opposite to photoelectric conversion element 112. In addition, in the present embodiment, diffraction grating 323 is formed in first optical surface 121 in the transmission region. In the present embodiment, no diffraction grating 323 is formed in second optical surface 322.

In the present embodiment, light blocking part 324 is formed in the outer surface of optical receptacle 320. Light blocking part 324 may be formed in the entire outer surface of optical receptacle 320, or may be formed only in a region where primary diffraction light reaches. In this manner, the primary diffraction light generated at diffraction grating 323 disposed in first optical surface 121 can be efficiently blocked.

Also in the optical module according to Modification 2 of the present embodiment, preferably, diffraction grating 323 is configured such that the zero-order diffraction light reaches the end portion of optical transmission member 130 whereas the primary diffraction light does not reach the end portion of optical transmission member 130 so that only the zero-order diffraction light reaches the end portion of optical transmission member 130.

Effect

The optical module according to the present embodiment has an effect similar to that of optical module 100 according to Embodiment 1.

Modification 3

Next, an optical module according to Modification 3 of the present embodiment is described. The optical module according to the present modification differs from optical module 100 according to Embodiment 1 only in the configuration of optical receptacle 420. In view of this, the components similar to those of optical module 100 according to Embodiment 1 are denoted with the same reference numerals and the description thereof is omitted.

Figure 5A:
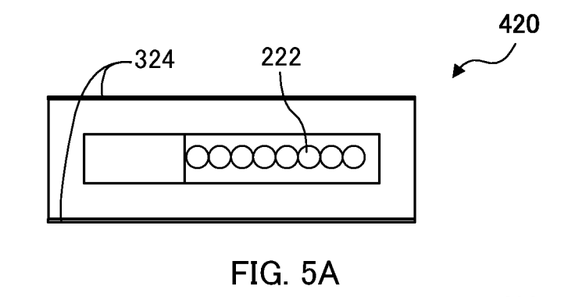
FIGS. 5A to 5D illustrate a configuration of an optical receptacle according to Modification 3 of Embodiment 1.
Figure 5B:
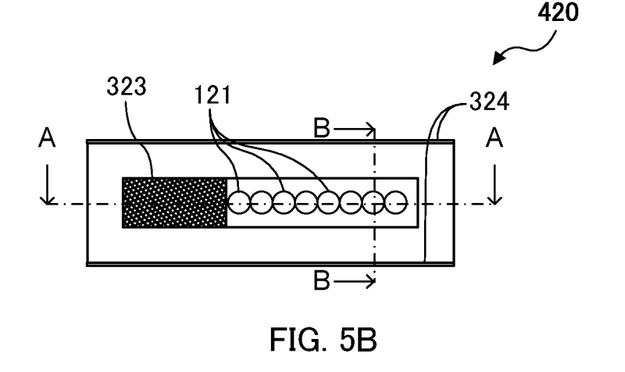
Figure 5C:
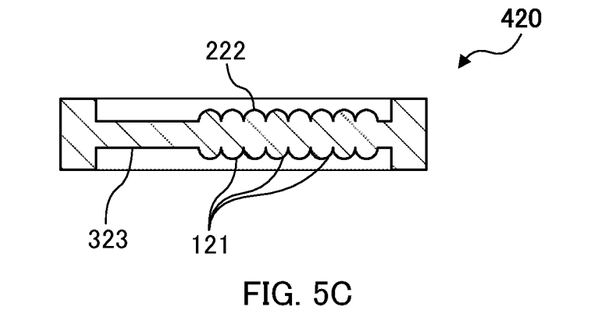
Figure 5D:
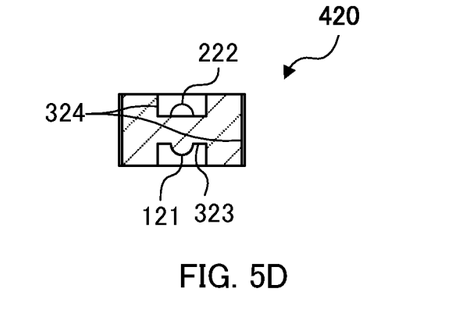

FIGS. 5A to 5D illustrate a configuration of optical receptacle 420 according to Modification 3 of Embodiment 1. FIG. 5A is a plan view of optical receptacle 420 according to Modification 3 of the present embodiment, FIG. 5B is a bottom view, FIG. 5C is a sectional view taken along line A-A of FIG. 5B, and FIG. 5D is a sectional view taken along line B-B of FIG. 5B.

Configuration of Optical Receptacle

As illustrated in FIGS. 5A to 5D, optical receptacle 420 includes first optical surface 121, second optical surface 222, diffraction grating 323, and light blocking part 324. In the present embodiment, in the transmission region, first optical surface 121 is a flat surface disposed opposite to photoelectric conversion element 112. In addition, in the present embodiment, diffraction grating 323 is formed in first optical surface 121 in the transmission region. In the present embodiment, no diffraction grating 323 is formed in second optical surface 222.

In the present embodiment, in the reception region, second optical surface 222 is a convex lens surface protruding toward optical transmission member 130. They are disposed opposite to the end surface of optical transmission member 130 in a line along the longitudinal direction. Preferably, the central axis of second optical surface 222 coincides with the central axis of the end surface of optical transmission member 130.

Also in the optical module according to Modification 3 of the present embodiment, preferably, diffraction grating 323 is configured such that the zero-order diffraction light reaches the end portion of optical transmission member 130 whereas the primary diffraction light does not reach the end portion of optical transmission member 130 so that only the zero-order diffraction light reaches the end portion of optical transmission member 130.

In the present embodiment, light blocking part 324 is formed in the outer surface of optical receptacle 120. In this manner, the primary diffraction light generated at diffraction grating 323 disposed in first optical surface 121 can be efficiently blocked.

Effect

The optical module according to the present embodiment has an effect similar to that of optical module 100 according to Embodiment 1.

Embodiment 2

Configuration of Optical Module

Optical module 500 according to Embodiment 2 differs from optical module 100 according to Embodiment 1 only in the configuration of optical receptacle 520. In view of this, the same configurations as those of optical module 100 are denoted with the same reference numerals and the description thereof is omitted.

Figure 6:
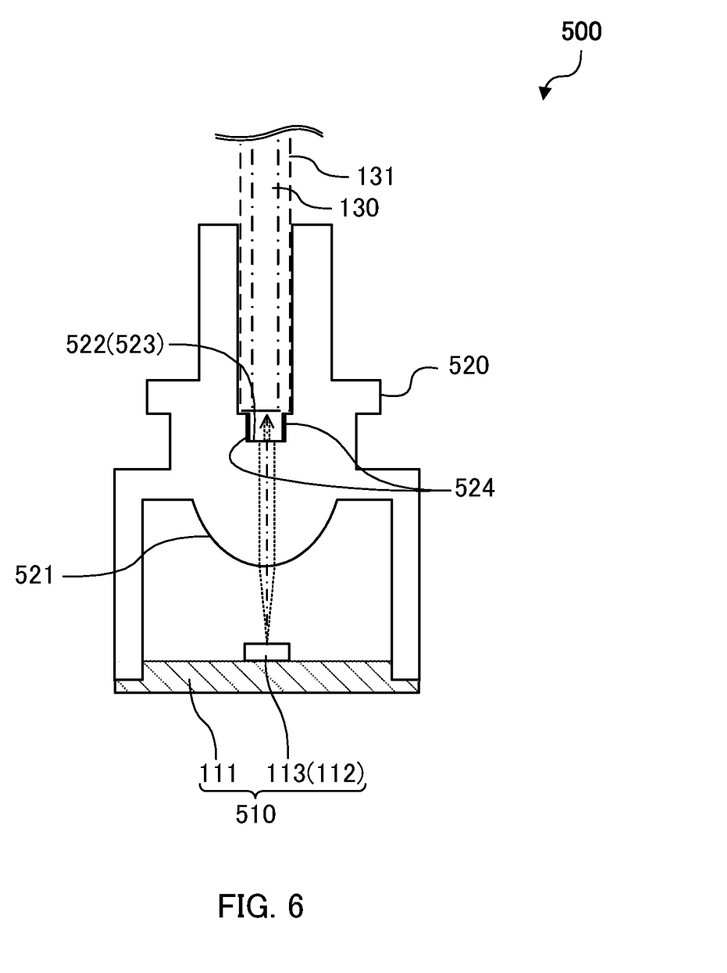
FIG. 6 is a sectional view of an optical module according to Embodiment 2.
Figures 7A, 7B, 7C:
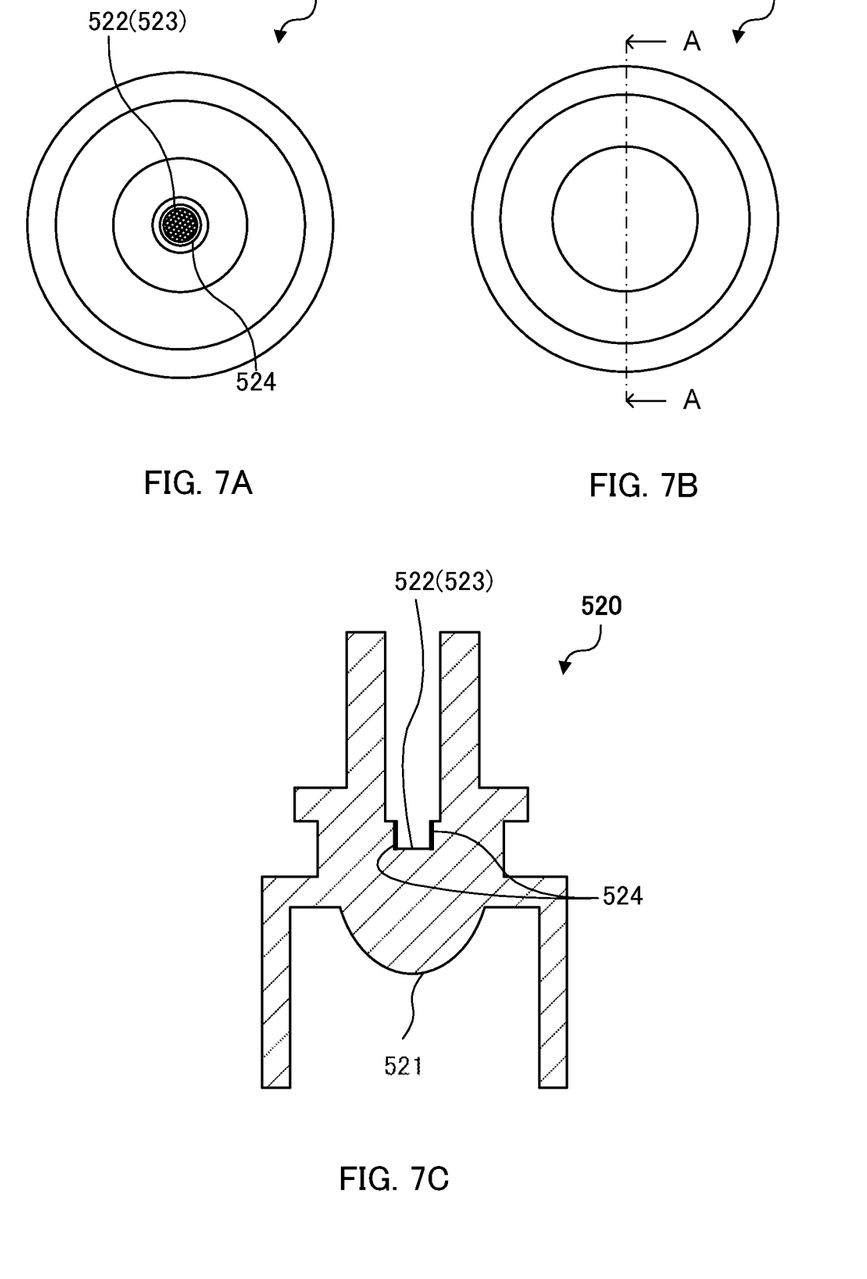
FIGS. 7A to 7C illustrate a configuration of an optical receptacle according to Embodiment 2.

FIG. 6 is a sectional view of optical module 500 according to Embodiment 2. FIGS. 7A to 7C illustrate a configuration of optical receptacle 520 according to Embodiment 2. FIG. 7A is a plan view of optical receptacle 520 according to Embodiment 2, FIG. 7B is a bottom view of optical receptacle 520, and FIG. 7C is a sectional view taken along line A-A of FIG. 7B. Note that in FIG. 6, the hatching of optical receptacle 520 is omitted for illustration of light paths. In FIG. 6, the center of the light flux is illustrated with a dashed line, and the outline of the light flux is illustrated with a dotted line.

As illustrated in FIG. 6, optical module 500 according to Embodiment 2 includes photoelectric conversion device 510 and optical receptacle 520. Optical module 500 according to the present embodiment is transmitting optical module 500. As such, photoelectric conversion element 112 of the present embodiment is light emitting element 113.

Configuration of Optical Receptacle

Optical receptacle 520 according to the present embodiment is a transmitting optical receptacle. Optical receptacle 520 includes first optical surface 521, second optical surface 522, diffraction grating 523, and light blocking part 524. In the present embodiment, first optical surface 521 is a convex lens surface disposed opposite to light emitting element 113. In the present embodiment, second optical surface 522 is a flat surface disposed opposite to the end surface of optical transmission member 130. In addition, diffraction grating 523 is disposed in second optical surface 522. In optical receptacle 520 of the present embodiment, first optical surface 521 and second optical surface 522 are not arrays. That is, in the present embodiment, one light emitting element 113, one first optical surface 521 and one second optical surface 522 are provided.

Also in the optical module according to the present embodiment, preferably, diffraction grating 523 is configured such that the zero-order diffraction light reaches the end portion of optical transmission member 130 whereas the primary diffraction light does not reach the end portion of optical transmission member 130 so that only the zero-order diffraction light reaches the end portion of optical transmission member 130.

Light blocking part 524 is formed in the inner surface of the recess where second optical surface 522 (diffraction grating 523) is formed.

Next, light paths in optical module 500 according to the present embodiment are described. Light emitted from photoelectric conversion element 112 (light emitting element 113) enters optical receptacle 520 from first optical surface 521. At this time, light entered into optical receptacle 520 is converted into collimated light by first optical surface 521, and advances inside optical receptacle 520. Next, the light entered into optical receptacle 520 is emitted by second optical surface 522 toward the end portion of optical transmission member 130. Here, diffraction grating 523 is disposed in second optical surface 522, and therefore, of the diffraction light generated from of the light having traveled inside optical receptacle 520, only the zero-order diffraction light reaches the end portion of optical transmission member 130. In addition, the primary diffraction light is blocked by light blocking part 524.

Effect

Optical module 500 according to the present embodiment has an effect similar to that of optical module 100 according to Embodiment 1.

While first optical surface 521 is a convex lens surface and second optical surface 522 is a flat surface in optical receptacle 520 according to Embodiment 2, first optical surface 521 may be a flat surface, and second optical surface 522 may be a convex lens surface. In this case, it is preferable that diffraction grating 523 be formed in first optical surface 521. In addition, it is preferable that light blocking part 524 be formed in the outer surface of optical receptacle 520.

Embodiment 3

Configuration of Optical Module

Optical module 600 according to Embodiment 3 differs from optical module 100 according to Embodiment 1 only in the configuration of optical receptacle 620. In view of this, the same configurations as those of optical module 100 are denoted with the same reference numerals and the description thereof is omitted.

Figure 8:
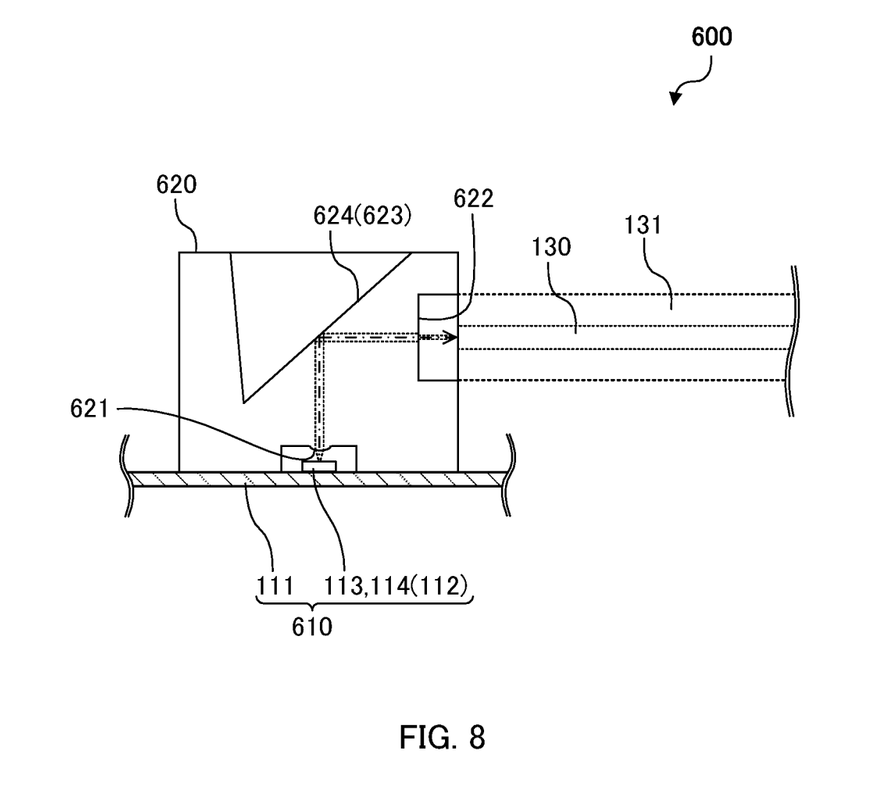
FIG. 8 is a sectional view illustrating a configuration of an optical module according to Embodiment 3.
Figure 9A:
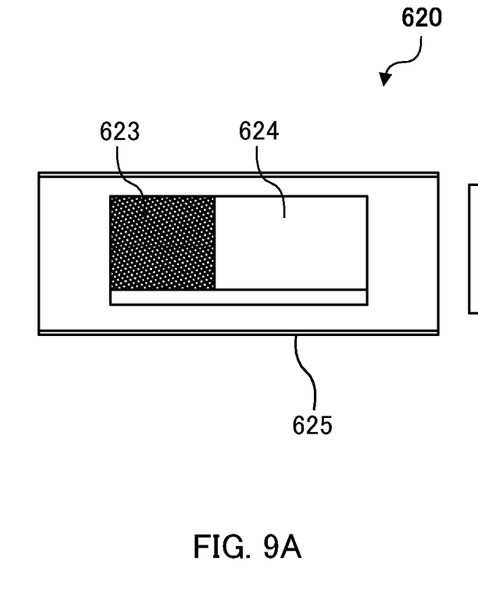
FIGS. 9A to 9D illustrate a configuration of an optical receptacle according to Embodiment 3.
Figure 9B:
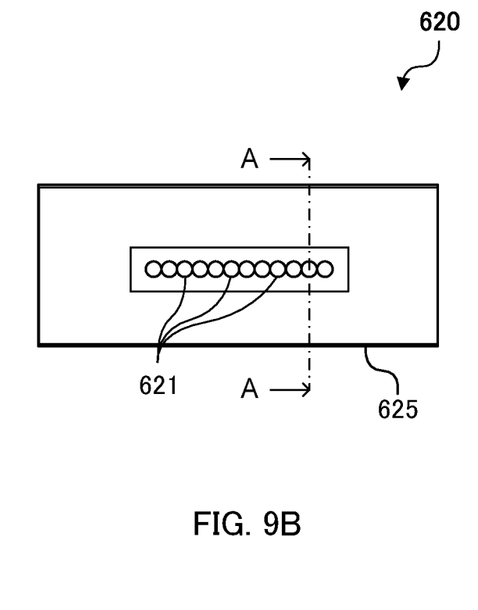
Figure 9C:
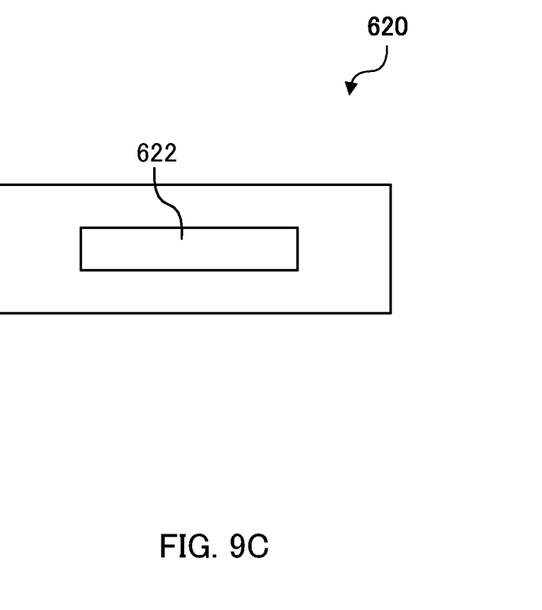
Figure 9D:
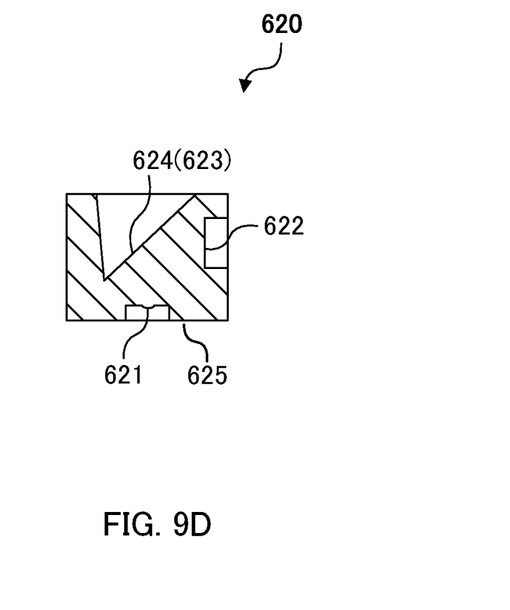

FIG. 8 is a sectional view of optical module 600 according to Embodiment 3. FIGS. 9A to 9D illustrate a configuration of optical receptacle 620 according to Embodiment 3. FIG. 9A is a plan view of optical receptacle 620 according to Embodiment 3, FIG. 9B is a bottom view of optical receptacle 620, and FIG. 9C is a right side view of optical receptacle 620, and FIG. 9D is a sectional view taken along line A-A of FIG. 9B. Note that in FIG. 8, the hatching of optical receptacle 620 is omitted for illustration of light paths. In FIG. 8, the center of the light flux is illustrated with a dashed line, and the outline of the light flux is illustrated with a dotted line.

As illustrated in FIG. 8, optical module 600 according to Embodiment 3 includes photoelectric conversion device 610 and optical receptacle 620.

Configuration of Optical Receptacle

Optical receptacle 620 according to the present embodiment is a transmitting and receiving optical receptacle. Optical receptacle 620 includes first optical surface 621, second optical surface 622, diffraction grating 623, third optical surface 624, and light blocking part 625.

Third optical surface 624 is a reflecting surface that reflects, toward second optical surface 622, light entered from first optical surface 621, or is a reflecting surface that emits, toward first optical surface 621, light entered from second optical surface 622. Third optical surface 624 is tilted to approach optical transmission member 130 in the direction from the bottom surface toward the top surface of optical receptacle 620. The inclination angle of third optical surface 624 is not limited. In the present embodiment, the inclination angle of third optical surface 624 is 45° with respect to the optical axis of light incident on third optical surface 624. The shape of third optical surface 624 is not limited. In the present embodiment, the shape of third optical surface 624 is a flat surface. Light entered from first optical surface 621 or second optical surface 622 impinges on third optical surface 624 at an incident angle equal to or greater than a critical angle. Diffraction grating 623 is disposed in third optical surface 624.

Also in optical module 600 according to the present embodiment, preferably, diffraction grating 623 is configured such that the zero-order diffraction light reaches the end portion of optical transmission member 130 whereas the primary diffraction light does not reach the end portion of optical transmission member 130 so that only the zero-order diffraction light reaches the end portion of optical transmission member 130.

In the present embodiment, light blocking part 625 is formed in the entire outer surface of optical receptacle 620.

Next, light paths in optical module 600 according to the present embodiment are described. Light emitted from photoelectric conversion element 112 (light emitting element 113) enters optical receptacle 620 from first optical surface 621. At this time, light entered into optical receptacle 620 is converted by first optical surface 621 into collimated light, and advances inside optical receptacle 620. The light entered into optical receptacle 620 is reflected by third optical surface 624 toward second optical surface 622. Here, diffraction grating 623 is disposed in third optical surface 624, and therefore, of the diffraction light generated from the light having traveled inside optical receptacle 520, only the zero-order diffraction light is reflected toward second optical surface 622. On the other hand, the primary diffraction light is reflected toward the outer surface of optical receptacle 620, and blocked by light blocking part 625. The light reflected by third optical surface 624 (zero-order diffraction light) is emitted by second optical surface 622 toward the end portion of optical transmission member 130 (see FIG. 8). On the other hand, the light emitted from optical transmission member 130 enters optical receptacle 620 from second optical surface 622. The light entered into optical receptacle 620 is reflected by third optical surface 624 toward first optical surface 621. The light reflected by third optical surface 624 is emitted to the outside from first optical surface 621. The light emitted at first optical surface 621 reaches light reception element 114.

Effect

Optical module 600 according to the present embodiment has an effect similar to that of optical module 100 according to Embodiment 1.

While diffraction grating 623 is disposed in third optical surface 624 in optical receptacle 620 according to Embodiment 3, diffraction grating 623 may be disposed in first optical surface 621, or in second optical surface 622. In addition, while first optical surface 621 is a convex lens surface protruding toward photoelectric conversion element 112 in optical receptacle 620 according to Embodiment 3, first optical surface 621 may be a flat surface. In addition, while second optical surface 622 is a flat surface in optical receptacle 620 according to Embodiment 3, second optical surface 622 may be a convex lens surface protruding toward the end surface of optical transmission member 130, or a concave lens surface recessed toward the end surface of optical transmission member 130. In the case where diffraction grating 623 is formed in first optical surface 621, light blocking part 625 is formed in the outer surface of optical receptacle 620. In the case where diffraction grating 623 is formed in second optical surface 622, light blocking part 625 is formed in the inner surface of the recess.

INDUSTRIAL APPLICABILITY

The optical receptacle and the optical module according to the embodiments of the present invention are suitable for optical communications using an optical transmission member.

REFERENCE SIGNS LIST 100, 500, 600 Optical module
110, 510, 610 Photoelectric conversion device
111 Substrate
112 Photoelectric conversion element
113 Light emitting element
114 Light reception element
120, 220, 320, 420, 520, 620 Optical receptacle
121, 521, 621 First optical surface
122, 222, 322, 522, 622 Second optical surface
123, 323, 523, 623 Diffraction grating
124, 324, 524, 625 Light blocking part
130 Optical transmission member
131 Ferrule
624 Third optical surface

What is claimed is:

1. An optical receptacle configured to be disposed between a light emitting element and an optical transmission member and configured to optically couple the light emitting element and the optical transmission member, the optical receptacle comprising:
 a first optical surface configured to allow incidence of light emitted from the light emitting element;
 a second optical surface configured to emit, toward the optical transmission member, light emitted from the light emitting element and advanced inside the optical receptacle;
 a third optical surface disposed on a light path between the first optical surface and the second optical surface, the third optical surface being configured to reflect, toward the second optical surface, light entered from the first optical surface; and
 a diffraction grating disposed on the first optical surface, on the second optical surface, or on the light path, and
 wherein the diffraction grating is configured such that zero-order diffraction light of the light emitted from the light emitting element reaches an end portion of the optical transmission member, and that primary diffraction light of the light emitted from the light emitting element does not reach the end portion of the optical transmission member.

2. The optical receptacle according to claim 1, wherein the diffraction grating is configured such that only the zero-order diffraction light reaches the end portion of the optical transmission member.

3. The optical receptacle according to claim 1, wherein the diffraction grating is disposed on the second optical surface.

4. The optical receptacle according to claim 1, further comprising a light blocking part configured to block the primary diffraction light transmitted through the diffraction grating.

5. The optical receptacle according to claim 1,
 wherein the diffraction grating is disposed on the third optical surface.

6. An optical module, comprising:
a photoelectric conversion device including a light emitting element; and
an optical receptacle configured to optically couple, to an optical transmission member, light emitted from the light emitting element,
wherein the optical receptacle is the optical receptacle according to claim 1.

* * * * *